United States Patent [19]
May

[11] Patent Number: 5,979,716
[45] Date of Patent: Nov. 9, 1999

[54] VENTED CONTAINER SEAL WITH POURING SPOUT

[76] Inventor: Myron R. May, 14 Loriann Rd., Warren, N.J. 07059

[21] Appl. No.: 09/033,421

[22] Filed: Mar. 2, 1998

[51] Int. Cl.⁶ ........................................................ B67D 3/00
[52] U.S. Cl. ........................... 222/485; 222/494; 222/520
[58] Field of Search ..................................... 222/494, 520, 222/484, 485

[56] References Cited

U.S. PATENT DOCUMENTS

| | | | |
|---|---|---|---|
| 3,067,916 | 12/1962 | Lerner | 222/519 |
| 3,248,025 | 4/1966 | Santore | 222/520 |
| 4,513,891 | 4/1985 | Hain et al. | 222/494 |

*Primary Examiner*—Philippe Derakshani
*Attorney, Agent, or Firm*—John E. Vandigriff

[57] ABSTRACT

The fluid control device of the invention can be a reusable device for use on a variety of liquid containers. The fluid control device includes a set of air vents and a spout molded into its body. The device screws onto a container. There may be optional "legs" or tabs that serve to hold the device onto the container when it has been partially unscrewed for dispensing of the container's contents. A thin membrane or gasket is molded or situated inside the device. Slits are cut into this material adjacent to the first set of openings (air vents) and the second set of openings (the spout) allowing air to flow into the device as fluid flows out of the out of the spout opening. The gasket may have a molded channel, the channel having a first opening adjacent to the first set of openings in the device and a second opening located in the upper gasket lining of the device along the edge of the inside of the device midway between the first opening of the device and the second opening of the device.

11 Claims, 6 Drawing Sheets

5,979,716

VENTED CONTAINER SEAL WITH POURING SPOUT

FIELD OF THE INVENTION

The invention relates to fluid control devices, and more particularly to vented container seals for use in the dispensing of liquids from containers.

BACKGROUND OF THE INVENTION

Fluid containers are used by persons in a variety of situations from refreshments and sports drinks to medication or dietary supplements. In some instances it is a simple act to remove a cap from a bottle and drink or dispense of the container's contents. In other situations it may be difficult to drink or dispense of the container's contents in recommended volume or without spilling. Additionally, an open container, one without a fluid control device, will spill its contents freely when knocked over or dropped resulting in unnecessary waste.

U.S. Pat. No. 5,542,670 is a Flow Control Element and Covered Drinking Cup. This patent describes not only a cap, but the container to which it attaches. They are both part of the intended design. The cap (not including the container to which it attaches) is a two part device. The cap proper and a flow control element that is attached to the under side of the cap. There are two molded tubes or channels that extend down under the cap's spout and vent. The two parts have the a flow control element attached to them. The design is considered spill resistant, but the cap is always open.

U.S. Pat. No. 5,593,055 describes a snap-on, screw-off cap with a tamper-evident skirt and container. The patent relates to both the cap and bottle. The container has ratchet teeth molded into the outer wall off the upper neck allowing the snap-on cap to grip and lock to the container making the opening impossible without rupture of a tamper evident band.

U.S. Pat. No. 3,780,898 shows a screw cap closure. The cap design is thermo-formed from a sheet of thin plastic. It has a seal in its upper/inner lid so as to seal a container by screwing the cap down on the bottle and pressing the seal tightly against the upper rim of the container. This is a cost saving method of producing the generic screw cap for bottles. No spout or pouring ability is mentioned. No function beyond sealing the container is described.

SUMMARY OF THE INVENTION

The fluid control device of the invention may be used as reusable device for use on a variety of liquid containers. The fluid control device includes a set of air vents and a spout molded into its body. The device screws onto a container. There may be optional "legs" or tabs that serve to hold the device onto the container when it has been partially unscrewed for dispensing of the container's contents. In a first embodiment, a thin membrane or gasket is molded or situated inside the device. Slits are cut into this material adjacent to the first set of openings (air vents) and the second set of openings (the spout) allowing air to flow into the device as fluid flows out of the spout opening.

In a second embodiment, a gasket with a molded channel is located in the device with the channel having a first opening adjacent to the first set of openings in the device and a second opening located in the upper gasket lining of the device along the edge of the inside of the device midway between the first opening of the device and the second opening of the device. There is also gasket openings adjacent to the second set of openings of the device. In this embodiment, when the device is in the open position, fluid will flow freely from the attached container through the device as the container is tilted.

DESCRIPTION OF A PREFERRED EMBODIMENT

Figure 1:
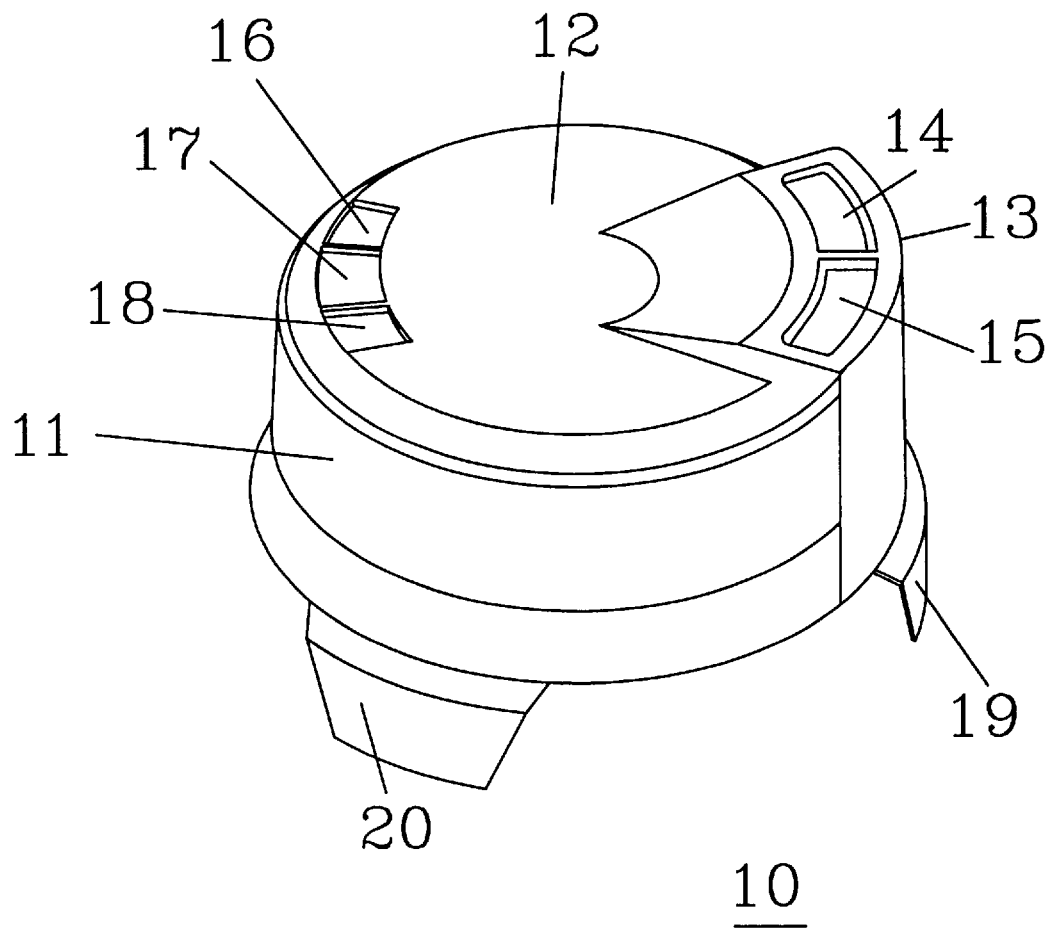
FIG. 1 is an isometric illustration of the fluid control device.

FIG. 1 shows an isometric view of the fluid control device 10 of the present invention. Device 10 has a top side 12 in which there are two large openings 14, 15, in the spout 13. Openings 14, 15 are used for pouring or sipping liquid from a container on which device 10 is mounted. Side 11 of device 10 has, on its bottom edge, three tabs 19, 20, and 21 (FIG. 2) which are used to prevent device 10 from detaching from a container when device 10 is partially unscrewed from the container, if the container has a ring around the neck of the container, as described below.

Also in device 12 are three smaller openings 16, 17, 18 which are used to allow air to be drawn through the fluid control device and into the attached container when drinking or removing liquid from the attached container without removing the fluid control device from the container.

Figure 2:
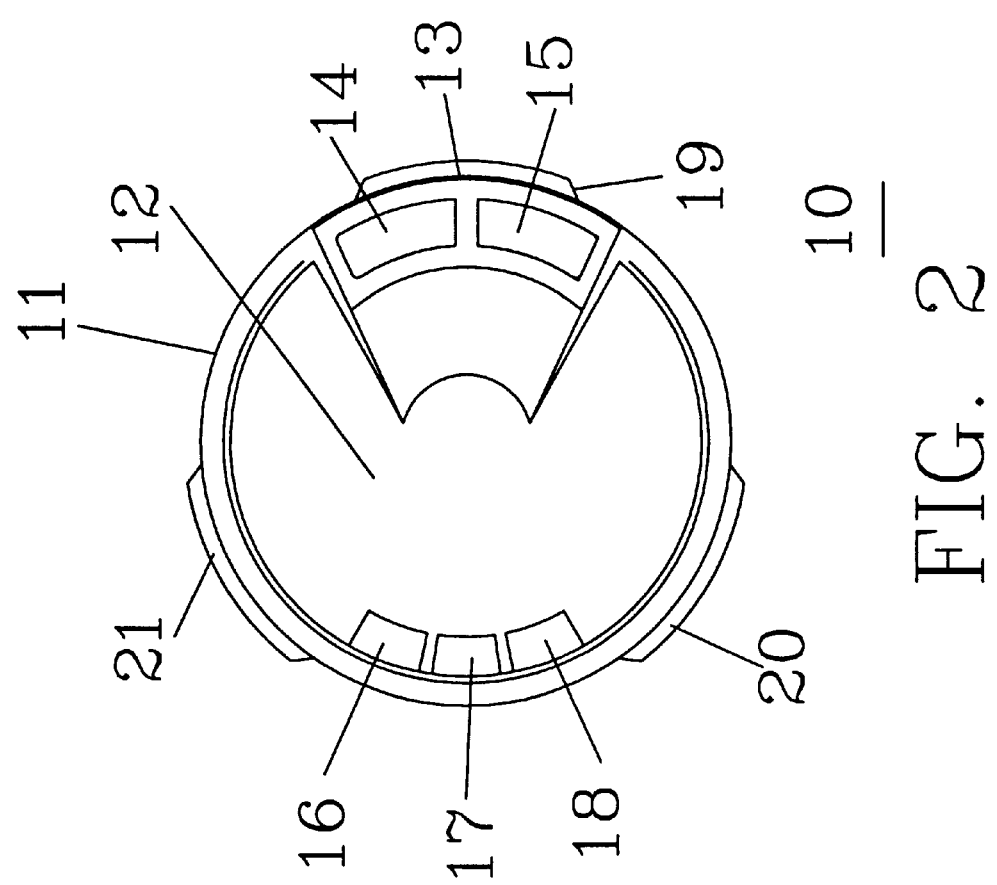
FIG. 2 is a top view of the fluid control device.

FIG. 2 is a top view of device 10 showing large openings 14 and 15 in the spout 13 with the small openings 16,17,18 diagonally opposite from openings 14,15. The securing tabs 19, 20 and 21 are evenly spaced around device 10.

Figure 3:
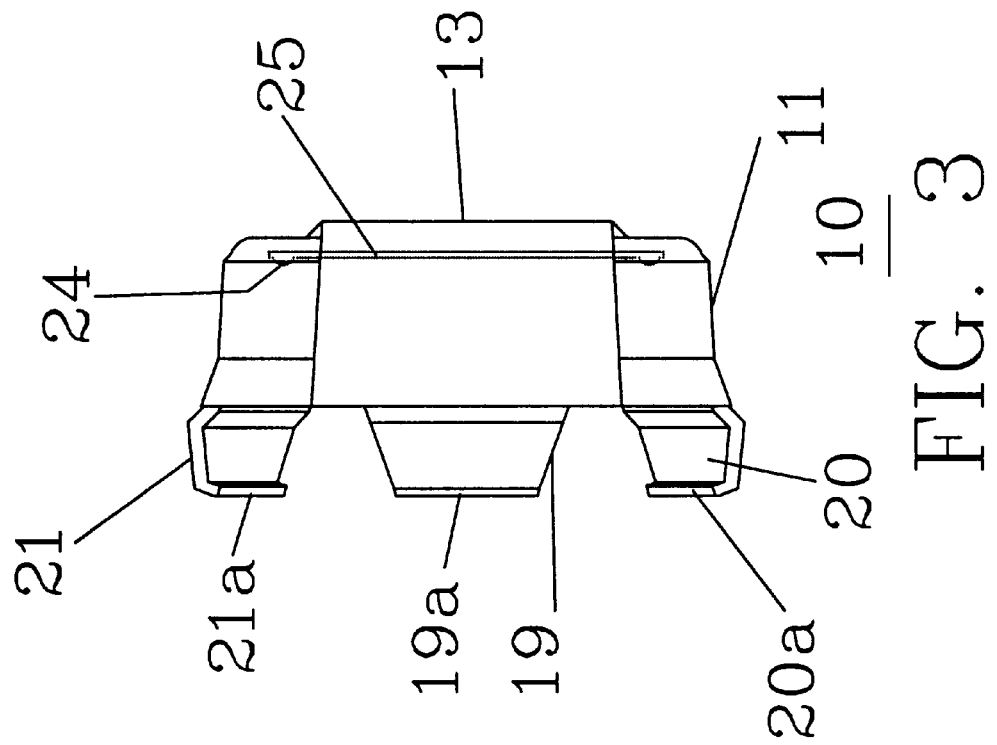
FIG. 3 is a side view of the fluid control device.

FIG. 3 is a side view of device 10 showing spout 13 extending above top 12. Each tab 19, 20, 21 has an inwardly projecting edge, 19a, 20a, and 21a, respectively, which are used in conjunction with a projection on the neck of the container to hold device 10 on the container when device 10 is partially unscrewed from the container. A seal ring 24 and sealing material 25 are shown with dashed lines in the inside top of the device.

Figure 4:
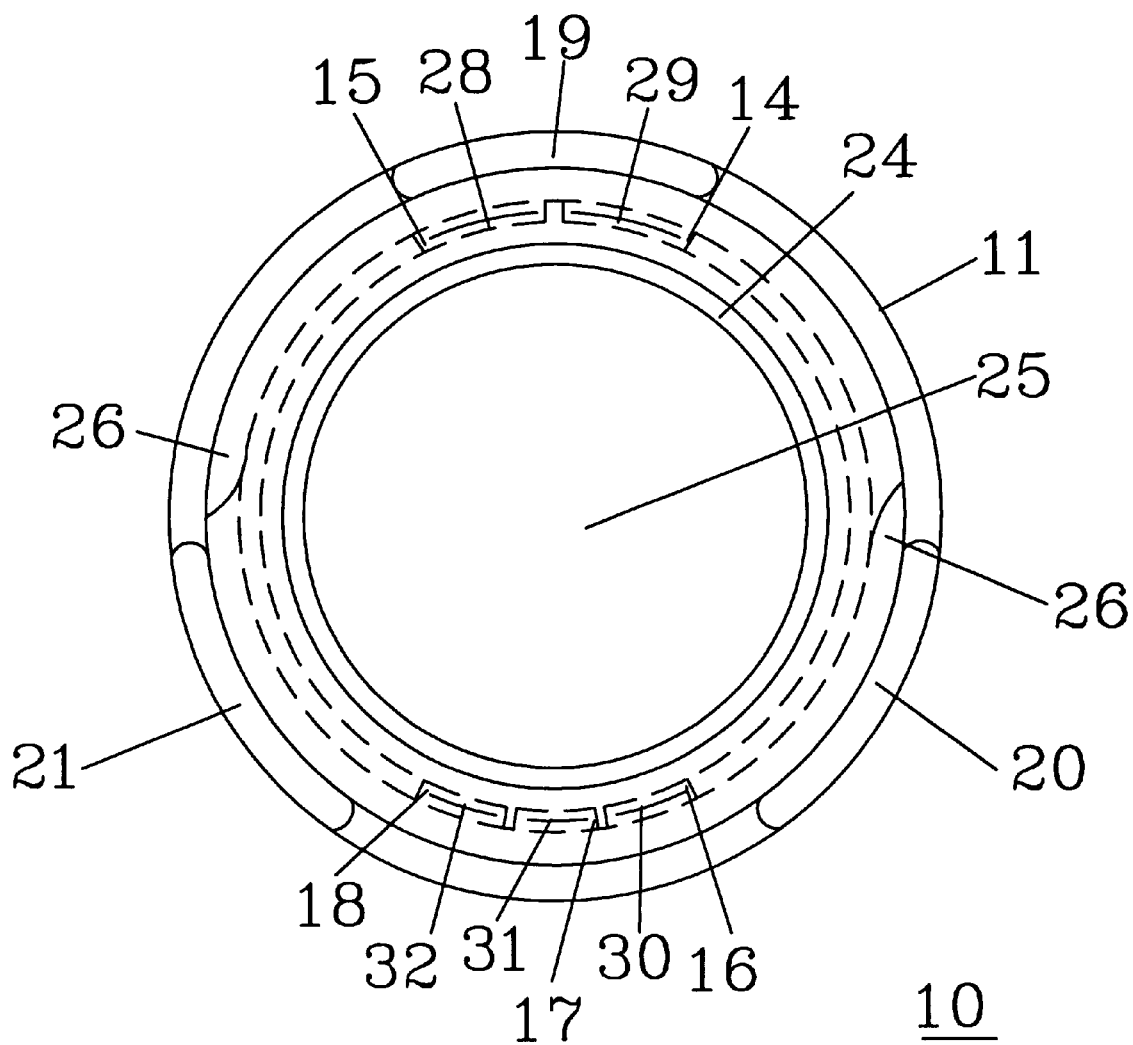
FIG. 4 is a bottom view of the first embodiment.

FIG. 4 is a bottom view of fluid control device 10, looking into the inside of the fluid control device. Optional securing tabs 19–21 are shown around the bottom rim of the device. Large openings 14 and 15 are shown as well as smaller openings 16–18. Device threads 26 are shown extending out from the inside of side 11 wall. A sealing material indicated at 25 coats the inside of the device 10 forming seal ring 24 and covering both sets of openings 14–15 and 16–18. After the sealing material has been applied over the openings 14–18. Small slits are cut in the sealing material under the openings. Slit 28 is under opening 15, slit 29 is under opening 14, slit 30 is under opening 16, slit 31 is under opening 17 and slit 32 is under opening 18. Slits 30–32 are made to allow air to be drawn into device 10 when it is partially unscrewed from the container and slits 28 and 29 allow fluid to be drawn from the container through device 10 when it is partially unscrewed from the container.

Figure 5:
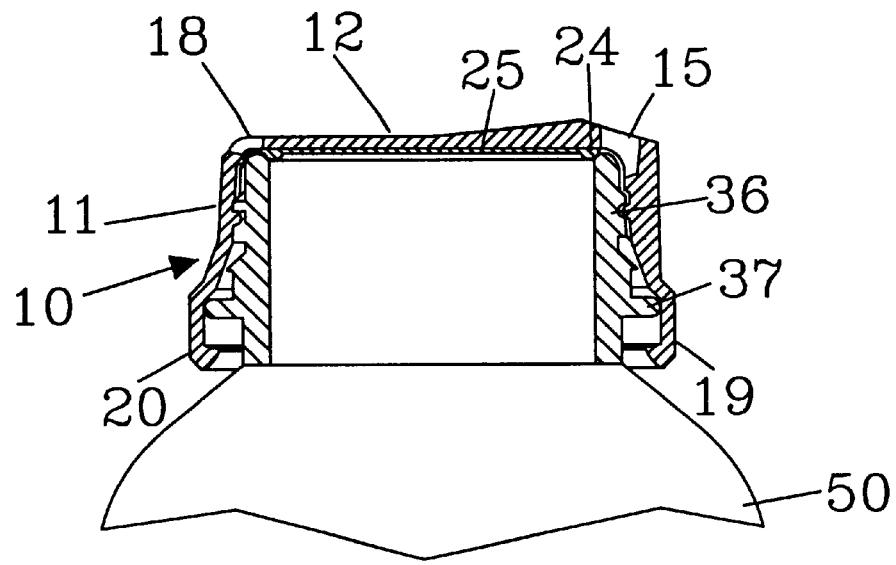
FIG. 5 is a partial cross-sectional view showing the fluid control device on a container with the device in the closed position.

FIG. 5 shows device 10 on container 50, with device 10 sealing the top of neck 36 of container 50. Securing tabs 19 and 20 are shown over neck ring 37 on neck 36. Seal ring 24 is sealed against the inside rim of neck 36. This seals air openings 16–18 (only opening 18 is shown). Also sealed are openings 14 and 15 (only opening 15 is shown in FIG. 5).

Figure 6:
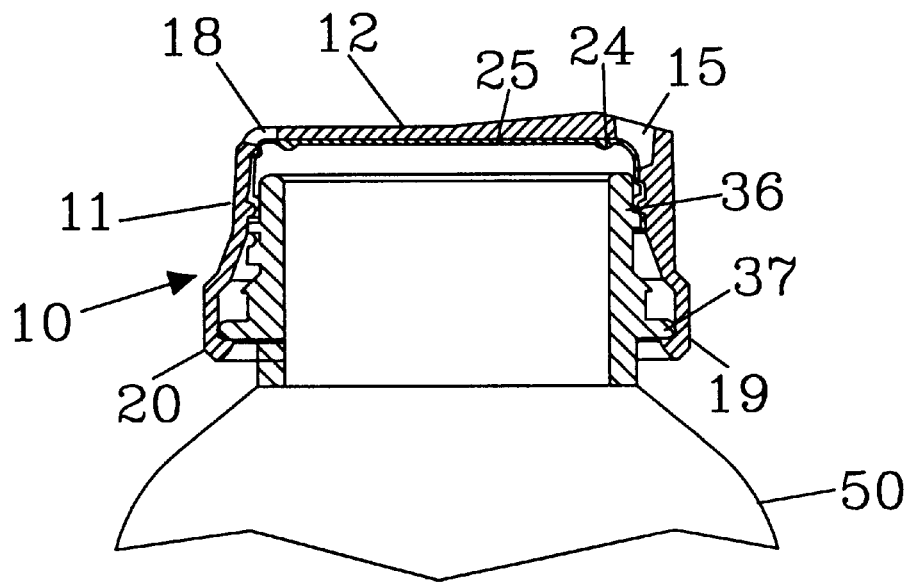
FIG. 6 is a partial cross-sectional view showing the fluid control device on a container with the device in the partially opened position.

FIG. 6 shows fluid control device 10 partially unscrewed from neck 36. Securing tabs 19 and 20 are shown to have moved upward to rest against neck ring 37. Fluid control device 10 can be removed by further unscrewing the fluid control device along the inner threading path of the device and the outer threading path of the neck of the container, thus, causing the flexible material of the securing tabs 19–21 to flex outward allowing the tabs to travel over the neck ring of the container and allowing further unscrewing to result in the removal of the device from the container.

With fluid control device 10 in upward position, a person may drink or remove contents from attached container through device 10 by tilting the container and sucking on openings 14 and 15. The sucking draws liquid from container 50 through the slits 28 and 29 under openings 14 and 15 in spout 13 as air is drawn through slits 30–32 under openings 16-18. The container may be tilted with fluid control device 10 in the upward position, but little or no liquid will spill from the container due to seal material 25. The slits 28, 29 and 30–32 in seal 25 are not sufficiently open to allow liquid to pass through the slits freely. A sucking action or pressure placed on the container through squeezing the walls of the container (in the event the container is made of a flexible plastic) is required to remove fluid/liquid in this first embodiment. The surface tension of the liquid in the container does not allow the liquid to pass through slits 28, 29 and 30–32 without either sucking action or squeezing action or some other means to cause the pressure of the inside environment of the container to be greater than the pressure outside the container.

Figure 7:
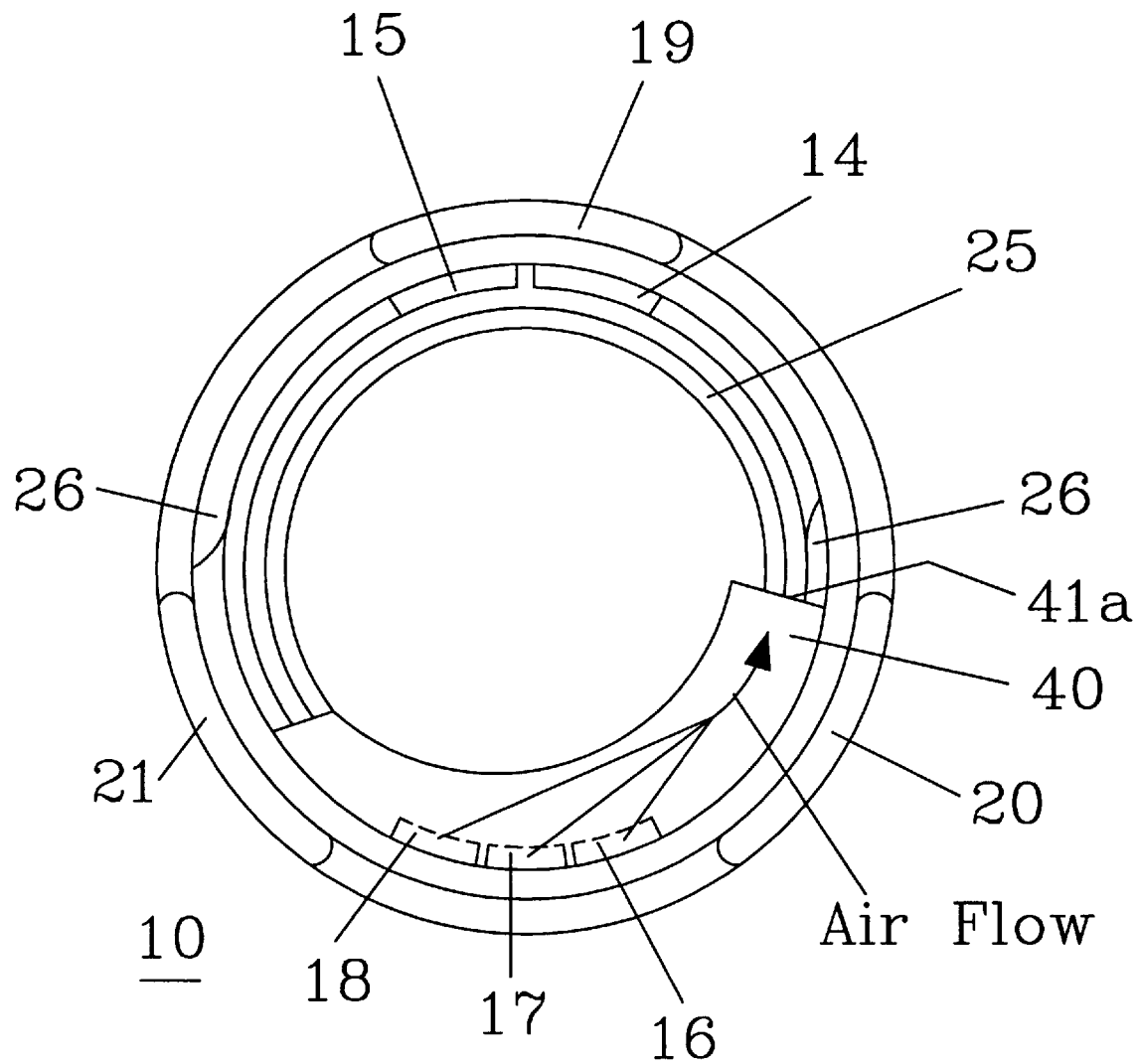
FIG. 7 is a bottom view of a second embodiment.

FIG. 7 shows fluid control device 10 with a second embodiment of the seal on the inside top of the device. Fluid control device 10, in FIG. 7 is the same as in previous illustrations except for the seal on the inside top of the fluid control device. Device 10 has a spout 19 with openings 14 and 15, and air flow openings 16–18. Threads 26 are shown around the inside of fluid control device 10, and the three securing tabs 19–21 are shown. In FIG. 7, sealing material is placed on the inside top of device 10, under openings 16–18, and forming channel 41 (FIG. 9) which opens at a position about 90 degrees from openings 16–18. Air flow in channel 41 is indicated by the arrow labeled "Air Flow".

Figure 8:
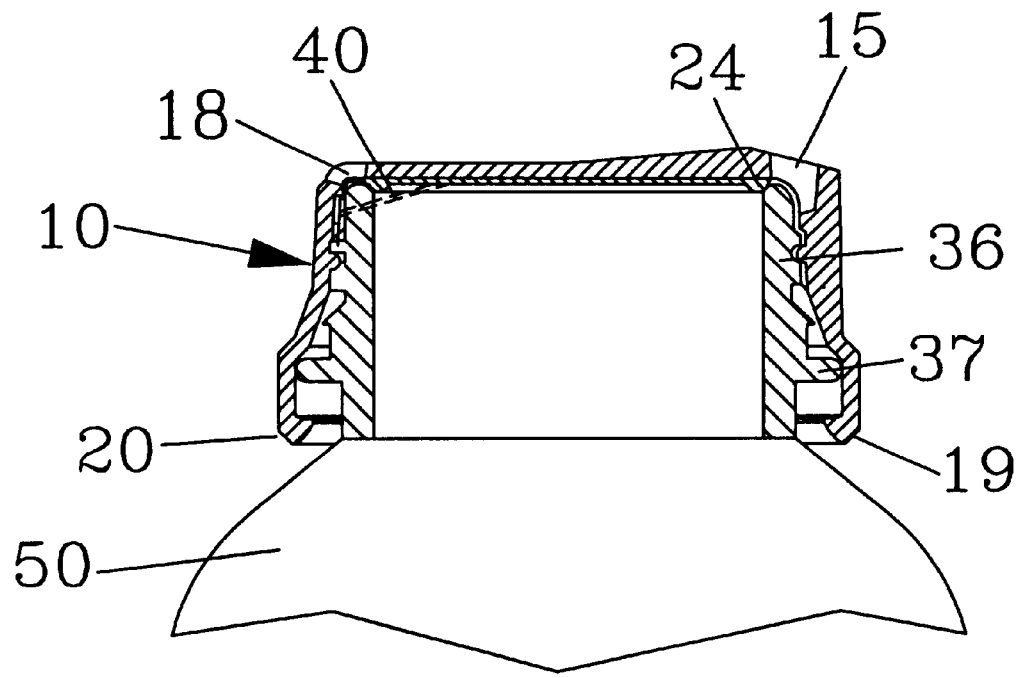
FIG. 8 is a partial cross-sectional view showing the fluid control device on a container with the device in the closed position.

FIG. 8 shows fluid control device 10 on container 50, with seal ring 24 sealing the top of neck 36 of container 50. Securing tabs 19 and 20 are shown over neck ring 37 on neck 36. Seal ring 24 is sealed against the inside rim of neck 36. This seals air openings 16–18 (only opening 18 is shown). Also sealed are openings 14 and 15 (only opening 15 is shown in FIG. 8). Air channel 41 is shown in dashed lines and is molded in the flexible sealing material. Channel 41 collapses against the top ridge of the container when the device is screwed tightly onto the container into the closed position, and channel 41 flexes back to original open shape when the device is unscrewed to the partially opened position. Alternatively, channel 41 may be formed in the top of device 12.

Figure 9:
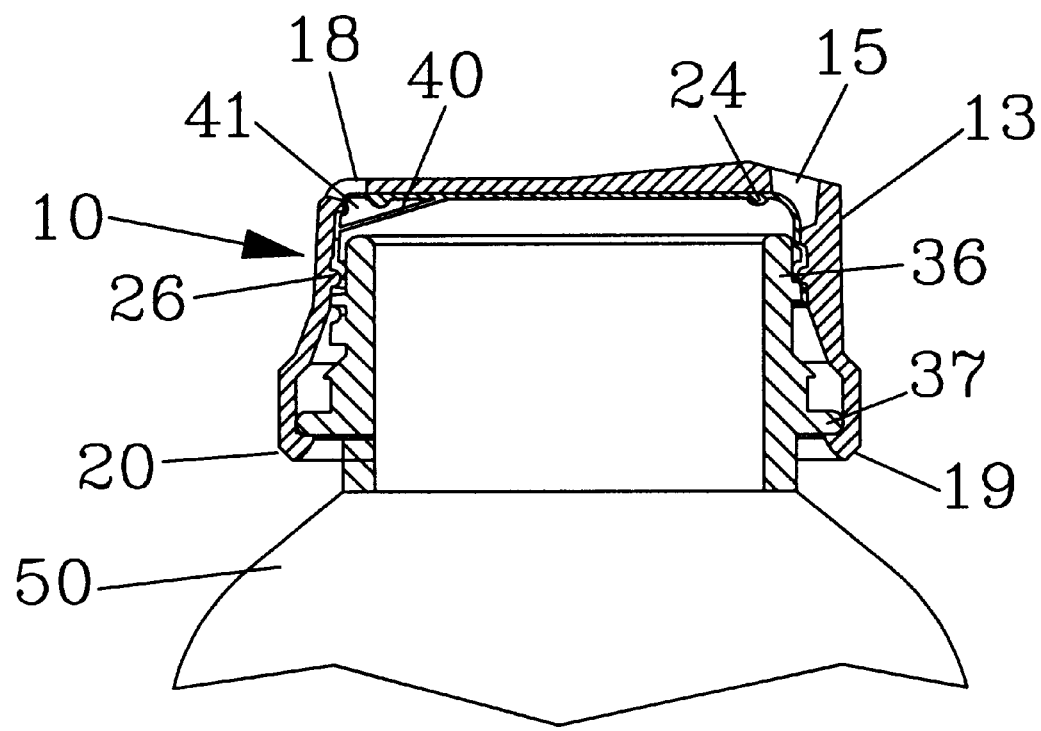
FIG. 9 is a partial cross-sectional view showing the fluid control device on a container in the partially opened position.

FIG. 9 shows fluid control device 10 with the spout 13 with openings 14 and 15, and the air flow through openings 16–18. Threads 26 are shown around the inside of the device 10, and two of the three securing tabs 19–21 are shown. Sealing material 40 is placed in the inside top of fluid control device 10, under openings 16–18, forming channel 41 which contains a first opening at openings 16–18 and a second opening 41*a* at a position about 90 degrees from openings 16–18. Air can flow into openings 16–18 and through channel 41 inside the top of fluid control device 10 and into the attached container's cavity through channel 41 and out of second opening 41*a*. Fluid control device 10 is shown partially unscrewed from neck 36. Securing tabs 19 and 20 are shown to have moved upward to rest against neck ring 37. Fluid control device 10 can be removed by further unscrewing the fluid control device along the inner threading path of the device and the outer threading path of the neck of the container, thus, causing the flexible material of the securing tabs 19–21 to flex outward allowing the tabs to travel over the neck ring of the container and allowing further unscrewing to result in the removal of the device from the container.

When the fluid control device 10 is in an upward position, a person may drink or remove contents from attached container through device 10 by tilting the container and pouring through openings 14 and 15. Air flows or is drawn through openings 16–18 and channel 41 of fluid control device as fluid freely flows our spout 13 through openings 14 and 15.

By screwing the fluid control device 10 shut, the operator forces the inner and upper surface seal 24 of fluid control device 10 down against the upper and inner rim of the container 50 neck 36 forming an air tight seal. This fluid control device is designed primarily for oral dispensing of fluids or medications, but liquid may freely be poured from the container utilizing the fluid control device of FIGS. 7–9 and dispensing from the container using the fluid control device illustrated in FIGS. 4–6 by suction or squeezing.

What is claimed is:

1. A reusable fluid control device for use on containers, comprising:

a cylindrical body having inside and outside walls;

a top enclosing on end of the cylindrical body, said top having an outside surface and an inside surface, said inside surface covered with a thin membrane having slits therein;

a spout forming a part of the outside wall and extending over and forming part of the top;

at least one opening in the spout extending through at least one of the cylindrical body and top;

at least one air hole in said device; and threads on the inside surface of the cylindrical body for securing the fluid control device to a container.

2. The fluid control device according to claim 1, including a sealing ring on the inside surface of the top.

3. The fluid control device according to claim 1, wherein said thin membrane seal on the inside of the device extends over the spout opening and air hole, said slits therein located under the spout and air hole.

4. The fluid control device according to claim 1, including at least one securing tab extending downward from the cylindrical wall, said securing tab for securing the fluid control device to a neck ring on a container when the device is partially unscrewed from the container.

5. The fluid control device according to claim 1, wherein said thin membrane forms a channel from the air hole to an opening positioned inside the device between the air hole and spout opening.

6. A reusable fluid control device for use on containers, comprising:

a cylindrical body having inside and outside walls;

a top enclosing one end of the cylindrical body, said top having an outside surface and an inside surface;

a spout forming a part of the outside wall extending over and forming a part of the top;

at least one opening in the spout extending through at least one of the cylindrical body and top;

at least one air hole in said device;

threads on the inside surface of the cylindrical body for securing the device to a container; and a thin membrane seal on the inside of the device extending under the spout opening and air hole, said membrane having slits therein under the spout and air hole.

7. The fluid control device according to claim 6, including a sealing ring on the inside surface of the top.

8. The fluid control device according to claim 6, including at least one securing tab extending downward from the cylindrical wall, said securing tab for securing the device to a ridge on a container when the device is partially unscrewed from the container.

9. A reusable fluid control device for use on a container, comprising:

a cylindrical body having inside and outside walls;

a top enclosing on end of the cylindrical body, said top having an outside surface and an inside surface;

a spout forming a part of the outside wall and extending over and forming a part of the top;

at least one opening in the spout extending through at least one of the cylindrical body and top;

at least one air hole in said device;

threads on the inside surface of the cylindrical body for securing the device to a container; and a sealing material in the device attached to the inside surface of the device over the air hole, and forming a channel from the air hole to an opening positioned between the air hole and spout opening.

10. The fluid device acccording to claim 9, including a sealing ring on the inside surface of the top.

11. The fluid control device according to claim 9, including at least on securing tab extending downward from the cylindrical wall, said securing tab for securing the device to a neck ring on a container when the device is partially unscrewed from the container.

* * * * *